United States Patent [19]

Vasiliev et al.

[11] 4,249,100
[45] Feb. 3, 1981

[54] DRIVE MEANS AND FORCE CONTROL FOR PIEZOELECTRIC VIBRATION MOTOR

[76] Inventors: Petr E. Vasiliev, ulitsa Ugnyagyasju, 9, kv. 17; Prantsishkus-Algirdas R. Klimavichjus, ulitsa Zhirmunu, 117, kv. 34; Alexandr V. Kondratiev, prospekt Kosmonavtov 43, kv. 72; Juozas J. Matsjukyavichjus, ulitsa Vesulo, 3, kv. 12; Gabrieljus-Vitautas L. Beksha, ulitsa Karalinishkju, 24, kv. 11; Vitautas A. Kaminskas, ulitsa Pyarkuno, 10, kv. 203, all of Vilnjus, U.S.S.R.

[21] Appl. No.: 29,490

[22] Filed: Apr. 12, 1979

[51] Int. Cl.³ .................................. H01L 41/08
[52] U.S. Cl. .................................. 310/317; 310/316; 310/328
[58] Field of Search ............... 310/328, 316, 330–332, 310/323, 325, 317

[56] References Cited

U.S. PATENT DOCUMENTS

| | | | |
|---|---|---|---|
| 3,447,051 | 5/1969 | Attwood et al. | 310/325 X |
| 3,666,599 | 5/1972 | Obeda | 310/316 X |
| 3,889,166 | 6/1975 | Scurlock | 310/325 X |
| 4,019,073 | 4/1977 | Vishnevsky et al. | 310/330 X |
| 4,065,687 | 12/1977 | Mishiro | 310/325 |

FOREIGN PATENT DOCUMENTS

536578  8/1975  U.S.S.R. .................. 310/323

*Primary Examiner*—Mark O. Budd
*Attorney, Agent, or Firm*—J. Harold Nissen

[57] ABSTRACT

The vibration motor comprises adjoining working and feed-back piezoelectric cells, one of which is in contact with one of the stages of a concentrator of ultrasonic vibrations, whose other stage is pressed to one of the rotor surfaces. The working piezoelectric cell is connected with the output of an electric oscillator, the feed-back piezoelectric cell is coupled to the oscillator sync input. Provision is made in the vibration motor for a means for rotation frequency control of the rotor by changing the hold-down force pressing the driving stage of the concentrator of ultrasonic vibrations to the rotor surface and/or by maintaining the amplitude of ultrasonic vibrations of the driving stage of the concentrator at a preset level, or by varying the hold-down force of the driving stage of the concentrator of ultrasonic vibrations alongside with changing the amplitude of ultrasonic vibrations of the concentrator driving stage.

13 Claims, 8 Drawing Figures

DRIVE MEANS AND FORCE CONTROL FOR PIEZOELECTRIC VIBRATION MOTOR

FIELD OF APPLICATION

The present invention relates to electric motors and more particularly to vibration motors.

The invention can be used to advantage in sound-recording and -reproducing devices, for example, in electric playback devices of domestic and professional standards.

BACKGROUND OF THE INVENTION

Known in the art are vibration motors comprising a working piezoelectric cell connected with the output of an electric oscillator and a feed-back piezoelectric cell connected with the sync input of the same oscillator. The working and feed-back piezoelectric cells are in contact with each other and one of them, in turn, contacts one of the stages of a concentrator of ultrasonic vibrations, whose driving stage is held pressed to one of the surfaces of the rotor (see, for instance, the USSR Inventor's Certificate No. 526012, IPS G11B 25/00, 1976).

Use is made in the said prior art vibration motors of a rod-like concentrator of ultrasonic vibrations, whose driving stage is held firm by an electromagnet against the side surface of a rotor and the other stage is in close contact with a feed-back piezoelectric cell which, in turn, contacts a working piezoelectric cell.

Due to variation of the piezoelectric cell parameters and concentrator-to-rotor contact zone with time and to instability of the oscillator electric parameters in the vibration motors of the type under consideration, it is difficult to attain a high degree of stability and uniformity of rotation frequency of the rotor in such vibration motors for a long period of time.

To reduce durable instability of the rotor rotation frequency, it is necessary either to exclude the effect of destabilizing factors or to provide automatic control of rotation frequency.

To reduce rotation frequency variations of the rotor, it is expedient to diminish the force pressing the concentrator to the rotor with a resultant greater positive effect of the rotor inertia. Reduction of the hold-down force deteriorates starting characteristics of the vibration motor and brings about an increase in durable instability of rotation frequency due to a greater effect of upsetting factors acting on the rotor. Any reduction of the hold-down force accompanied by a greater inertia effect of the vibration motor prolongs transient operating conditions, thereby narrowing the possibility of functional control of rotation frequency of the rotor.

SUMMARY OF THE INVENTION

It is an object of the present invention to reduce durable instability of rotation frequency of the rotor.

One more important object of the present invention is to reduce nonuniformity of rotation frequency of the rotor.

Another object of the invention is to improve starting characteristics of the vibration motor.

Yet another object of the invention is to provide a vibration motor with a wide possibility of functional control of rotation frequency of the rotor.

The invention resides in that in a vibration motor comprising a working piezoelectric cell connected with the output of an electric oscillator and a feed-back piezoelectric cell found in contact with the working piezoelectric cell and connected with the sync input of the same oscillator, with one of the piezoelectric cells being also in contact with one of the stages of a concentrator ultrasonic vibrations, whose driving stage is held pressed to one of the rotor surfaces, according to the invention, provision is made for a means for rotation frequency control of the rotor by changing the force pressing the driving stage of the concentrator of ultrasonic vibrations to the rotor surface and/or by maintaining the amplitude of ultrasonic vibrations of the driving stage of the concentrator at a predetermined level, or by varying the force pressing the driving stage of the concentrator of ultrasonic vibrations to the rotor surface in concert with changing the amplitude of vibrations of the concentrator driving stage.

To change the force pressing the driving stage of the concentrator of ultrasonic vibrations to the rotor surface, it is expedient that the means for control of rotation frequency of the rotor comprised a series-connected rotor rotation frequency pickup, a frequency discriminator, a controllable d-c power supply source and an electromagnet with the concentrator of ultrasonic vibrations used as an armature of the electromagnet.

To stabilize the amplitude of ultrasonic vibrations of the concentrator driving stage at a predetermined level, it is advisable that the means for control of rotation frequency of the rotor comprised in series a limiter, whose input was connected with the feed-back piezoelectric cell, an amplitude detector, a differential amplifier and a power amplifier, whose output was coupled to the control input of the electric oscillator.

In order to change the force pressing the driving stage of the concentrator of ultrasonic vibrations to the rotor surface in concert with variation of the amplitude of ultrasonic vibrations of the concentrator driving stage, the means for control of rotation frequency of the rotor may comprise in series a rotor rotation frequency pickup and a frequency discriminator with two outputs, at one of which the formed level amplitude has a relay-type relationship versus the rotation frequency of the rotor and at the other output the formed pulse duration changes as a V-shaped function of the rotation frequency of the rotor, and may comprise also a pulse converter, whose input is connected with the output of the frequency discriminator, at which the formed pulse duration is a V-shaped function of the rotation frequency of the rotor, an electromagnet, in which the concentrator of ultrasonic vibrations serve as an armature and which is connected to the output of the pulse converter, with the output of the frequency discriminator, at which the formed level amplitude has a relay-type relationship versus the rotation frequency of the rotor being connected with the control input of the electric oscillator through an amplifier.

It is quite reasonable that the frequency discriminator comprised a pedestal different-polarity pulse generator, two logic circuit elements with one input of each connected to the respective output of the pedestal different-polarity pulse generator, a trigger, whose input was electrically coupled to the rotation frequency pickup of the rotor and whose outputs were connected to other inputs of the logic circuit elements respectively, with one of the outputs connected also with the triggering input of the pedestal different-polarity pulse generator, one more logic circuit element, whose inputs were connected with the outputs of the above stated two logic circuit elements in the respective manner, whereas the element output was connected with the input of the pulse converter, and one more trigger, whose inputs were connected with the respective outputs of the said first two logic circuit elements and whose output was connected with the pedestal different-polarity pulse generator and via an amplifier with the control input of the electric oscillator.

It is expedient that the pulse converter comprised in series a trapezoidal voltage shaper coupled electrically to the output of the frequency discriminator, at which the formed pulse duration changed as a V-shaped function of the rotation frequency of the rotor, an amplitude detector and a power amplifier connected with the electromagnet.

A vibration motor constructed in accordance with the present invention makes it possible to reduce durable instability and nonuniformity of rotation frequency of the rotor, improve starting characteristics of the vibration motor and provide a possibility for a wider functional control of rotation frequency of the rotor.

BRIEF DESCRIPTION OF DRAWINGS

These and other objects of the present invention will be apparent from the following description of specific embodiments thereof taken in connection with the accompanying drawings, forming a part of this application, in which.

DETAILED DESCRIPTION OF PREFERRED EMBODIMENTS

Figure 1:
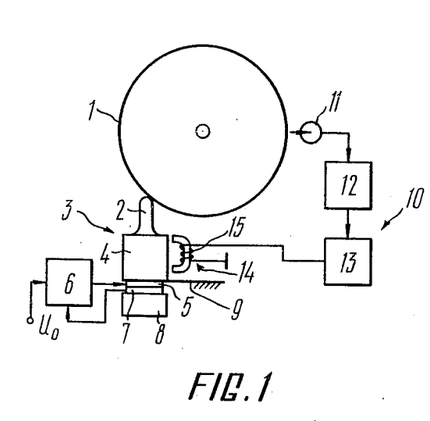
FIG. 1 shows an overall diagram of the vibration motor, according to the invention.

Referring now to FIG. 1, the vibration motor, according to the invention, comprises a rotor 1 and a rod-like concentrator 3 of ultrasonic vibrations, whose driving stage 2 is held pressed to the rotor side surface and whose other stage 4 is in contact with a working piezoelectric cell 5 connected with the output of an electric oscillator 6. The working piezoelectric cell 5, in turn, contacts a feed-back piezoelectric cell 7 connected to the sync input of the electric oscillator 6. The piezoelectric cells 5 and 7 are pressed to the stage 4 of the concentrator 3 by one more stage 8 serving as a frequency reducing covering part. The concentrator 3 is cantilever-mounted on a flat spring 9 attached to the vibration motor housing (not shown in the drawing).

According to the invention, the vibration motor comprises a means 10 for control of rotation frequency of the rotor 1 by changing the force pressing the driving stage 2 of the concentrator of ultrasonic vibrations to the side surface of the rotor 1. This means 10 comprises well known and series-connected rotation frequency pickup 11 of the rotor 1, a frequency discriminator 12, a controllable d-c power supply source 13 and an electromagnet 14 with a winding 15, in which the concentrator 3 of ultrasonic vibrations serves as an armature. Direct current voltage $U_o$ of an appropriate level is applied to the control input of the electric oscillator 6.

The described modification of the vibration motor is preferably adapted for use in hi-fi electric playback devices.

The electric playback devices of lower categories are reasonably to be equipped with a vibration motor provided in accordance with the invention with a means 16 (FIG. 2) for control of rotation frequency of the rotor 1 by stabilizing the amplitude of ultrasonic vibrations of the driving stage 2 of the concentrator 3 at a predetermined level.

Figure 3:
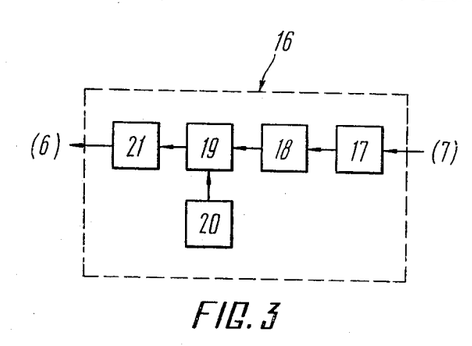
FIG. 3 is a block diagram of a means for rotation frequency control of the rotor of the vibration motor shown in FIG. 2.

The means 16 (FIG. 3) for control of rotation frequency of the rotor 1 by stabilizing the amplitude of ultrasonic vibrations of the driving stage 2 of the concentrator 23 at a predetermined level comprises in series an adjustable limiter 17, whose input is coupled to the feed-back piezoelectric cell 7, an amplitude detector 18, a differential amplifier 19 with a master subcircuit 20 and a power amplifier 21, whose input is connected with the control input of the electric oscillator 6.

The adjustable limiter 17 (FIG. 4) is built around a semiconductor diode 22, whose one electrode is connected with the feedback piezoelectric cell 7 and via resistor 23 with the sliding terminal of a variable resistor 24 and the other electrode is coupled to the base of a transistor 25. The variable resistor 24 is inserted in the circuit between a negative bias voltage source and the casing. A capacitor 26 is placed in the circuit between the sliding terminal of the variable resistor 24 and the casing. The negative electrode of the semiconductor diode 22 is also connected with the casing through a resistor 27. The collector of the transistor 25 is connected with the power supply bus, the emitter is coupled to the casing through a resistor 28.

Figure 4:
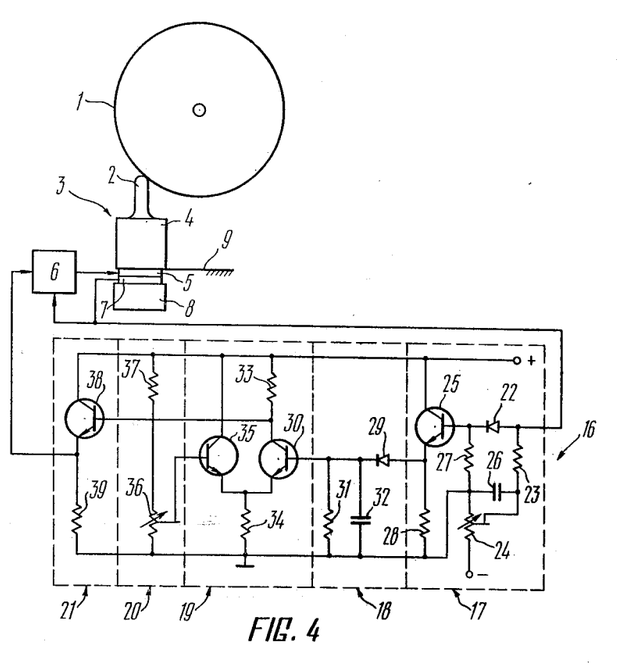
FIG. 4 shows an overall diagram of the vibration motor according to FIG. 2 and a basic circuit diagram of the means for rotation frequency control of the rotor presented in FIG. 3.

The positive lead of the semiconductor diode 29 of the amplitude detector 18 is connected with the emitter of the transistor 25. The other lead of the semiconductor diode 29 is connected with the base of the transistor 30 of the differential amplifier 19 and through paralleled resistor 31 and capacitor 32 with the casing. The collector of the transistor 30 of the differential amplifier 19 is coupled to the power supply bus via a resistor 33, the emitter thereof is connected via resistor 34 with the casing. The emitters of the transistors 30 and 35 are interconnected. The collector of the transistor 35 is connected with the power supply bus, whereas its base connects the sliding terminal of a variable resistor 36 forming in conjunction with a resistor 37 a master subcircuit 20. One lead of the variable resistor 36 is connected with the casing, the other with the power supply bus via the resistor 37.

The collector of the transistor 30 of the differential amplifier 19 is connected to the base of the transistor 38 of the power amplifier 21. The collector of the transistor 38 is connected with the power supply bus, its emitter via a resistor 39 is connected to the casing and to the control input of the electric oscillator 6.

The electric playback devices of a high-fidelity category may be equipped to advantage with a vibration motor (FIG. 5) provided, according to the invention, with a general means for control of rotation frequency of the rotor 1 by changing the force pressing the driving stage 2 of the concentrator 3 of ultrasonic vibrations to the side surface of the rotor 1 and by stabilizing the amplitude of ultrasonic vibrations of the driving stage 2 of the concentrator 3 at a predetermined level, which is actually a combination of the means 10 and 16.

Precision sound-recording and -reproducing devices and hi-fi electric playback devices can be equipped to advantage with a vibration motor (FIG. 6) provided with a means 40 for control of rotation frequency of the rotor 1 by changing the force pressing the driving stage 2 of the concentrator 3 of ultrasonic vibrations to the side surface of the rotor 1 in concert with varying the amplitude of ultrasonic vibrations of the driving stage 2 of the concentrator 3.

Figure 6:
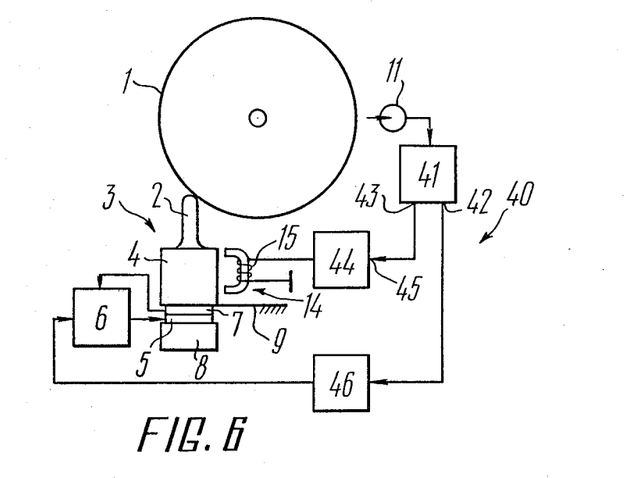
FIG. 6 shows an overall diagram of one more embodiment of the vibration motor, according to the invention.

In the modification of the vibration motor, according to the invention, the control means 40 comprises in series a rotation frequency pickup 11 of the rotor 1 and a frequency discriminator 41 provided with two outputs 42 and 43. At the output 42 the formed level amplitude is in a relay-type relationship versus the rotation frequency of the rotor 1, at the output 43 the duration of formed pulses changes as a V-shaped function of the rotation frequency of the rotor 1. The means 40 comprises also a pulse converter 44, whose input 45 is connected with the output 43 of the frequency discriminator 41, and an electromagnet 14 with a winding 15 connected to the output of the pulse converter 44. The output 42 of the frequency discriminator 41 is connected with the control input of the electric oscillator 6 through a well-known amplifier 46.

In this modification of the vibration motor the stage 4 of the concentrator 3 is in direct contact with the feedback piezoelectric cell 7 which, in turn, contacts the working piezoelectric cell 5.

The frequency discriminator 41 (FIG. 7) comprises a pedestal different-polarity pulse generator 7, two NAND logic circuit elements 48 and 49, whose inputs 50 and 51 are connected respectively with the outputs 52 and 53 of the generator 47, a trigger 54, whose counting input is electrically coupled to the rotation frequency pickup 11 of the rotor 1 via a rotation frequency pulse shaper 55, and the outputs 56 and 57 are connected with the other inputs 58 and 59 of the NAND logic circuit elements 48 and 49, respectively. The triggering input 60 of the pedestal different-polarity pulse generator 47 is coupled to the output 57 of the trigger 54. The frequency discriminator 41 comprises also one more NAND logic circuit element 61, whose inputs 62 and 63 are connected with the outputs of the NAND logic circuit elements 48 and 49 respectively and the output is coupled to the input 45 of the pulse converter 44, and one more trigger 64, whose selective triggering inputs are respectively connected with the outputs of the NAND logic circuit elements 48 and 49, and whose output is connected with the pedestal different-polarity pulse generator 47 and via the amplifier 46 with the control input of the electric oscillator 6.

Figure 7:
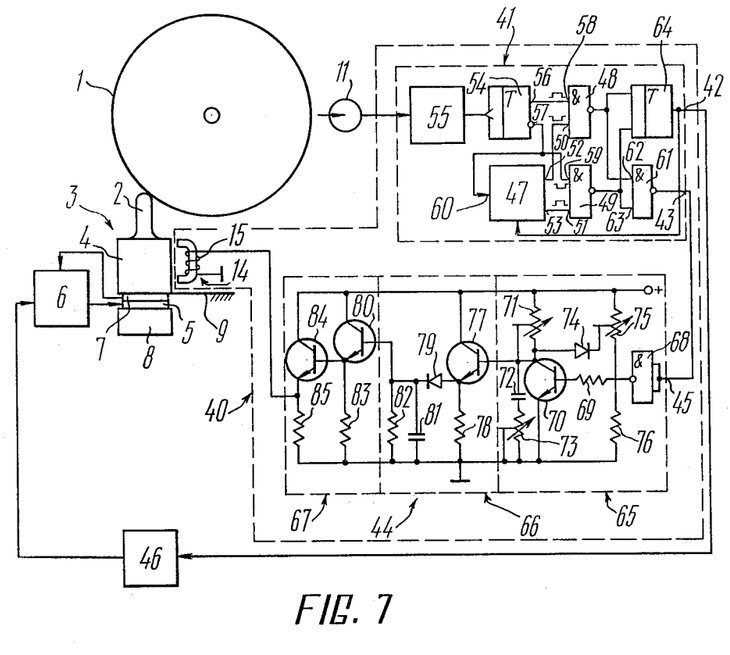
FIG. 7 shows a vibration motor overall diagram as in FIG. 6 and a basic circuit diagram of the means for control of rotor rotation frequency.

The pulse converter 44 comprises in series connection a trapezoidal voltage shaper 65, an amplitude detector 66 and a power amplifier 67, whose output is connected with the winding 15 of the electromagnet 14.

The output 43 of the frequency discriminator 41 is coupled to the base of the transistor 70 of the trapezoidal voltage shaper 65 via a logic circuit element 68 and a resistor 69 connected in series. The emitter of the transistor 70 is common, while its collector connects a variable resistor 71 intended for adjustment of the trapezoidal voltage droop. One of the leads of the variable resistor 71 is connected with the power supply bus. The collector of the transistor 70 is connected also with a capacitor 72, one plate of which is grounded through a variable resistor 73 used for setting nominal hold-down voltage. The collector of the transistor 70 connects also a diode 74 whose negative lead is connected with the sliding terminal of the variable resistor 75 serving for setting maximim trapezoidal voltage. One lead of the variable resistor 75 is connected with the power supply bus, the other is connected with the casing through a resistor 76. The collector of the transistor 70 is connected with the base of the emitter follower transistor 77 of the amplitude detector 66. The collector of the transistor 77 is coupled to the power supply bus, its emitter is connected with the casing through a resistor 78. The emitter of the transistor 77 connects the semiconductor diode 79 of the amplitude detector 66. The other lead of the diode is connected with the base of the first-stage transistor 80 of the power amplifier 67 and through a capacitor 81 and a resistor 82, connected in parallel, to the casing. The collector of the first-stage transistor 80 of the power amplifier 67 is connected with the power supply bus, the emitter is made common via a resistor 83. The emitter of the transistor 80 is directly coupled to the base of the second-stage transistor 84 of the power amplifier 67. The collector of the transistor 84 is connected with the power supply bus, the emitter is grounded through a resistor 85. Connected to the emitter of the transistor 84 is the winding 15 of the electromagnet 14, in which the concentrator 3 of ultrasonic vibrations is employed as an armature.

All the above described modifications of the vibration motor may be equipped with an electric oscillator 6 (FIG. 8) comprising is series a synchronization stage 86, whose input is connected with the feed-back piezoelectric cell 7, a master oscillator 87, a power amplifier 88 and a synchro-matching filter 89, whose output is connected with the working piezoelectric cell 5.

Figure 8:
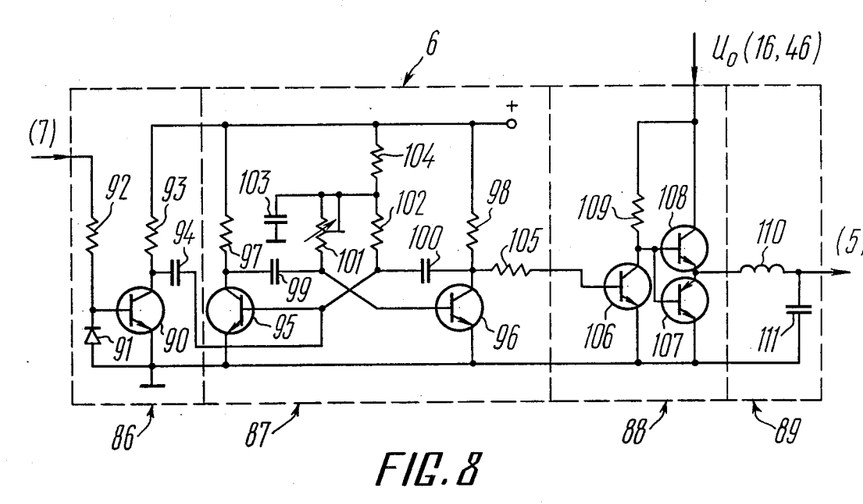
FIG. 8 is a basic circuit diagram of the electric oscillator of vibration motors shown in FIGS. 1 through 7.

The synchronizing stage 86 is built around a transistor 90 whose base is connected with a diode 91 and via a resistor 92 with the feed-back piezoelectric cell 7. The positive lead of the diode 91 and the emitter of the transistor 90 are grounded. The collector of the transistor 90 is coupled via a resistor 93 to the power supply bus and via a capacitor 94 to the base of the transistor 95 of the master oscillator 87. Used as the master oscillator 87 is a balanced self-excited multivibrator built around transistors 95 and 96 in the common-emitter configuration. The collectors of the transistors 95 and 96 through respective resistors 97 and 98 are connected with the power supply bus and directly to respective capacitors 99 and 100. The other leads of the capacitors 99 and 100 are respectively connected to the bases of the transistors 96 and 95 and to resistors 101 and 102. The other leads of the resistors 101 and 102 are interconnected and coupled to a capacitor 103 and through a resistor 104 to the power supply bus. The other lead of the capacitor 103 is connected with the casing. The collector of the transistor 96 is connected through a resistor 105 to the base of the transistor 106 of the power amplifier 88. The power amplifier 88 comprises a transistor 106 and an emitter-repeater with a complementary symmetry built around transistors 107 and 108 of different conductance.

The collector of the transistor 106 is connected with the interconnected bases of the transistors 107 and 108 and through a resistor 109 with the collector of the transistor 108. The collector lead of the transistor 108 is actually a control input of the electric oscillator 6. The emitter of the transistor 106 and the collector of the transistor 107 are connected with the casing. The interconnected emitters 107 and 108 through the inductance coil 110 of the synchro-matching filter 89 are connected with the working piezoelectric cell 5 and capacitor 111 whose other lead is grounded.

Although the vibration motor comprising, according to the invention, a rod-like concentrator of ultrasonic vibrations has been described, it is evident that the invention can be advantageously used in a vibration motor provided with a concentrator of torsional ultrasonic vibrations.

The operating principle of the vibration motor shown in FIG. 1 is as follows.

Upon excitation of the working piezoelectric cell 5 from the electric oscillator 6, ultrasonic mechanical vibrations emerge in said cell and propagate in the concentrator 3. To trim the electric oscillator 6 to the natural frequency of ultrasonic vibrations of the concentrator 3, signals from the feed-back piezoelectric cell 7 are supplied to the oscillator sync input. As current is applied to the winding 15 of the electromagnet 14 from the controllable d-c power supply source 13, the concentrator 3 is pressed to the rotor 1 which is driven by the vibration energy of the concentrator 3. In this modification of the vibration motor the electric oscillator 6 generates constant-amplitude electric oscillations. The amplitude of electric oscillations is determined by the magnitude of the d-c voltage $U_o$ supplied to the control input of the oscillator 6. The rotation frequency of the rotor 1 depends on the force pressing the concentrator 3 to the rotor 1 and is controlled by changing the force.

Signals from the rotation frequency pickup 11 of the rotor 1 are fed to the frequency discriminator 12. As soon as the rotation frequency of the rotor 1 deviates from the nominal value, a mismatch voltage is worked out in the frequency discriminator 12, which is delivered to the controllable d-c power supply source 13. In the controllable d-c power supply source the mismatch voltage is amplified and fed as a control voltage to the winding 15 of the electromagnet 14, in which the concentrator 3 of ultrasonic vibrations 3 is employed as an armature.

At the moment the vibration motor is switched on, when the rotor 1 is still motionless, the control voltage and hence the force pressing the driving stage of the concentrator 3 to the rotor 1 are maximum, which provides favourable conditions for fast acceleration of the rotor 1 to its nominal rotation frequency. As the rotation frequency of the rotor 1 approaches the nominal value, the control voltage and hence the force pressing the driving stage 2 of the concentrator 3 to the rotor 1 diminish, approaching their nominal values. In case the rotation frequency of the rotor 1 gets larger or smaller than nominal due to the action of perturbing factors, the control voltage and hold-down force increase or decrease accordingly. As a consequence, the rotation frequency of the rotor 1 remains constant.

The vibration motor of this construction features good starting characteristics, i.e. it takes little time to set the nominal rotation frequency of the rotor, which is maintained practically constant for a long period of time. The hold-down force imposed on the rotor 1 and rotating it at the nominal speed is minimum for the given rotation frequency, which is accompanied by a greater positive effect of the rotor inertia and results in a reduction of rotation frequency nonuniformity.

The vibration motor of this construction suffers from a narrower possibility of functional control of frequency of rotation of the rotor 1. When the rotor rotation frequency is changed over to a smaller value, the control voltage and hold-down force reduce to the respective minimum values. Therefore, a certain period of time is required for the rotor 1 to slow down to a new preset rotation frequency due to the rotor inertia effect.

Figure 2:
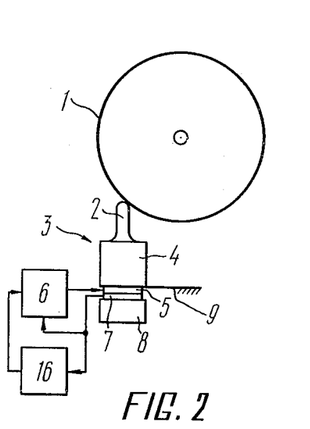
FIG. 2 is an overall diagram of another embodiment of the vibration motor, according to the invention.

In the vibration motor shown in FIG. 2 the driving stage 2 of the concentrator 3 of ultrasonic vibrations is pressed to the rotor 1 by means of a flat spring 9. The rotor 1 is driven by the energy of vibrations of the concentrator 3. The hold-down force pressing the driving stage 2 of the concentrator 3 to the rotor 1 remains constant in this case, while the rotation frequency of the rotor 1 is stabilized by providing a compensation for the action of perturbing factors affecting the amplitude of ultrasonic vibrations of the driving stage of the concentrator 3 and by maintaining the ultrasonic vibration amplitude at the predetermined level. The amplitude of ultrasonic vibrations of the driving stage 2 of the concentrator 3 is stabilized at the predetermined level through the use of a means 16 for control of rotation frequency of the rotor 1.

Applied to the input of the means 16 for control of rotation frequency of the rotor 1 is a signal corresponding to the amplitude of ultrasonic vibrations of the driving stage 2 of the concentrator 3 and the same signal is supplied from the feed-back piezoelectric cell 7. The feed-back voltage is compared with a preset reference voltage in the means 16. The means 16 intended for control of rotation frequency of the rotor 1 produces a mismatch voltage, which acts on the control input of the electric oscillator 6 and changes the oscillation amplitude so that the amplitude of ultrasonic vibrations of the driving stage 2 of the concentrator 3 remains constant at the predetermined level. The rotation frequency of the rotor 1 is determined by the stabilized level of vibrations and is controlled by changing the level of ultrasonic vibrations.

The signal corresponding to the amplitude of ultrasonic vibrations of the driving stage 2 of the concentrator 3 delivered from the feed-back piezoelectric cell 7 is supplied to the adjustable limiter 17 (FIG. 4) employing a semiconductor diode 22. The function of the limiter 17 is to specify the feed-back signal. The signal limit is set by a variable resistor 24 used for adjustment of the negative bias voltage. The limited feed-back signal is fed through the emitter repeater, built around a transistor 25, to the amplitude detector 18 employing a semiconductor diode 29, a resistor 31 and a capacitor 32. The rectified signal is fed to one of the inputs of the differential amplifier 19 built around transistors 30 and 35. The other input of the differential amplifier 19 is fed with an adjustable reference voltage supplied from the master subcircuit 20 and formed by means of resistors 36 and 37. Produced in the resistor 33 of the differential amplifier 19 is an amplified mismatch voltage, which is delivered through the power amplifier 21 and emitter repeater, built around a transistor 38, as a control voltage to the control input of the electric oscillator 6.

Provision of the means 16 for control of rotation frequency of the rotor 1 makes it possible to assemble a negative feed-back circuit, stabilizing the amplitude of the signal received from the feed-back piezoelectric cell 7, hence the amplitude of ultrasonic vibrations of the driving stage 2 of the concentrator 3 at the predetermined level and, consequently, the rotation frequency of the rotor 1. A definite rotation frequency of the rotor 1 set by the variable resistor 36 of the master subcircuit 20 corresponds to each preset amplitude level of vibrations of the driving stage 2 of the concentrator 3.

The rotation frequency stability factor of the rotor of the vibration motor shown in FIG. 2 is somewhat lower than that of the vibration motor presented in FIG. 1 and falls within ±1.8%. However, the vibration motor of FIG. 2 is simpler in construction, because it is deprived of a rotation frequency pickup. The means 16 for control of rotation frequency of the rotor 1 precludes not only comparatively slow variations of the amplitude of ultrasonic vibrations of the driving stage 2 of the concentrator 3, bearing an effect on durable instability of rotation frequency of the rotor 1, but rapid fluctuations of the amplitude as well, which originate from nonuniformity at the contact zone. All this results in a material reduction of nonuniformity of rotation frequency of the rotor 1 of the vibration motor.

Figure 5:
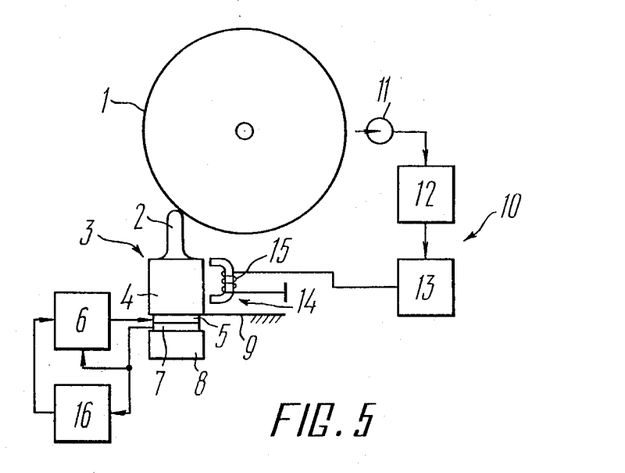
FIG. 5 shows an overall diagram of yet another embodiment of the vibration motor, according to the invention.

The vibration motor presented in FIG. 5 is provided with a means for control of rotation frequency of the rotor 1 by changing the force pressing the driving stage 2 of the concentrator 3 of ultrasonic vibrations to the side surface of the rotor 1 and by stabilizing the amplitude of ultrasonic vibrations of the driving stage 2 of the concentrator 3 at a predetermined level. The vibration motor of this modification is distinguished by a high degree of durable stability of rotation frequency of the rotor 1, which is attained due to adjustment of the force pressing the driving stage 2 of the concentrator 3, and by a substantially reduced nonuniformity of rotation frequency of the rotor 1 due to stabilization of the amplitude of ultrasonic vibrations of the driving stage 2 of the concentrator 3.

The rotation frequency of the rotor 1 of the vibration motor shown in FIG. 6 is controlled both by changing the force pressing the driving stage 2 of the concentrator 3 of ultrasonic vibrations to the side surface of the rotor 1 and by varying the amplitude of ultrasonic vibrations of the driving stage.

Signals from the rotation frequency pickup 11 of the rotor 1 are fed to the frequency discriminator 41. The frequency discriminator 41 compares the rotation frequency signal period with the duration of the reference pulse corresponding to the preset rotation frequency of the rotor 1, generates a voltage at a level, which is in a relay-type relationship versus the rotation frequency of the rotor 1 with the switchover at the given rotation frequency, and produces pulses whose duration changes as a V-shaped function of the rotation frequency of the rotor 1 with the extreme value at the given rotation frequency. From the output 42 of the frequency discriminator 41 the formed voltage of the relay-type relationship versus the rotation frequency of the rotor 1 is supplied through the amplifier 46 to the control input of the electric oscillator 6. The formed pulses, whose duration changes as a V-shaped function of the rotation frequency of the rotor 1, are delivered from the output 43 of the frequency discriminator 41 to the pulse converter 44 to be converted into a d-c voltage in accordance with the pulse duration. The formed voltage is amplified and fed to the winding 15 of the electromagnet 14, in which the concentrator 3 of ultrasonic vibrations serves as an armature.

At the instant the vibration motor is started the control input of the electric oscillator 6 and the winding 15 of the electromagnet 14 are fed maximum voltages. Therefore, the amplitude of oscillations of the electric oscillator 6 and hence the amplitude of ultrasonic vibrations of the driving stage of the concentrator 3, as well as the force pressing the driving stage 2 to the side surface of the rotor 1 are maximum. Favourable conditions are set up for rapid acceleration of the vibration motor rotor 1. As soon as the rotor 1 attains the preset rotation frequency, the control voltage of the oscillator 6 and hence the amplitude of ultrasonic vibrations of the driving stage 2 of the concentrator diminish. When the rotation frequency of the rotor 1 approaches the preset value, the force pressing the driving stage 2 of the concentrator 3 to the rotor reduces due to the V-shaped characteristics of the control voltage, and as soon as the preset rotation frequency is attained, the hold-down force gets minimum. In case the rotation frequency of the rotor 1 happens to drop below the predetermined value because of the effect of some perturbing factors, the control voltage and hence the amplitude of ultrasonic vibrations of the driving stage of the concentrator, as well as the force pressing the driving stage to the side surface of the rotor 1 increase, tending to reestablish the rotation frequency of the rotor 1. In case the rotation frequency of the rotor 1 exceeds the predetermined value, the control means 40 acts in such a way that the amplitude of vibrations of the driving stage 2 of the concentrator 3 reduces, while the force pressing the driving stage to the side surface of the rotor increases, producing a breaking effect and bringing the rotor 1 to the predetermined rotation frequency. The rotation frequency of the rotor 1 is thus stabilized at the predetermined value.

The vibration motor of this construction features fair starting characteristics and due to a relay-type control of the amplitude of ultrasonic vibrations of the driving stage 2 of the concentrator 3 ensures a high stability of rotation frequency of the rotor 1 within a wide range of load acting on the rotor 1. Rotation of the rotor 1 at nominal speed is accompanied by a minimum force pressing the driving stage 2 of the concentrator 3 to the side surface of the rotor 1, which materially reduces the degree of nonuniformity of rotation frequency of the vibration motor. Since the force pressing the driving stage 2 of the concentrator 3 of the rotor 1 increases both in underspeeding and over/speeding, the vibration motor exhibits a wider possibility for functional control of rotation frequency of the rotor 1.

Let us consider the operation of the vibration motor shown in FIG. 6 in detail.

Signals from the rotation frequency pickup 11 (FIG. 7) of the rotor 1 are delivered through the rotation frequency pulse shaper 55 to the counting input of the trigger 54. Formed at the outputs 56 and 57 of the trigger 54 are pulses of different polarity whose duration equals the pulse repetition period of the rotation frequency of the rotor 1. The pedestal different-polarity pulse generator 47 is triggered into operation by the negative front of the formed pulse from the output 57 or by the positive front of the pulse from the output 56 (not shown in the circuit diagram) of the trigger 54. The duration of the pedestal pulses is set to correspond to the required rotation frequency of the rotor 1. The formed pedestal pulse of positive polarity is delivered from the output 53 of the generator 47 to the input 51 of the NAND logic circuit element 49. Arriving at the other input 59 of the same element 49 is a negative comparable pulse drawn from the output 57 of the trigger 54. A negative pulse appears at the output of the logic circuit element 49 only in case the duration of the comparable pulse is less than that of the pedestal pulse, that is in case the rotation frequency of the rotor 1 is more than the preset value. The duration of the pulse at the output of the NAND logic circuit element 49 equals the difference between the duration of the positive pedestal pulse and that of the negative comparable pulse.

From the output 52 of the generator 47 the negative-polarity pedestal pulse is applied to the input 50 of the NAND logic circuit element 48. The input 58 of the element 48 receives the positive-polarity comparable pulse originating from the output 56 of the trigger 54. A negative pulse appears at the output of the NAND logic circuit element 48 only in case the duration of the comparable pulse is greater than that of the pedestal pulse, that is in case the rotation frequency of the rotor 1 is less than the preset value. The duration of the pulse appearing from the output of the NAND logic circuit element 48 equals the difference between the duration of the negative pedestal pulse and that of the positive comparable pulse. The outputs of the NAND logic circuit elements 48 and 49 are connected with the selective-triggering inputs of the trigger 64. When a pulse originates from the NAND logic circuit element 48 (i.e. at a rotation frequency of the rotor 1 less than the predetermined one), a logic-unit level is set at the output of the trigger 64. When a pulse originates from the NAND logic circuit element 49 (when the rotation frequency of the rotor 1 exceeds the predetermined one), a logic-zero level is set at the output of the trigger 64. The purpose of the trigger 64 is to provide a relay-type relationship between the voltage level and the rotation frequency of the rotor 1. To enhance steadiness in control, provision is made for a negative feed-back between the output of the trigger 64 and the pedestal different-polarity pulse generator 47.

Signals from the outputs of the NAND logic circuit elements 48 and 49 are supplied also to the inputs 62 and 63 of the NAND logic circuit element 61. A signal appears from the output of the NAND logic circuit element 61 in case a negative pulse is available at any of the element inputs. Formed at the output of the logic circuit element 61 are positive pulses, whose duration corresponds to the deviation of the rotation frequency of the rotor 1 from the predetermined rotation frequency, that is the duration of the formed output pulses changes as a V-shaped function of the rotation frequency of the rotor 1.

Pulses from the output of the NAND logic circuit element 61 are delivered to the trapezoidal voltage shaper 65, wherein the applied pulse duration is converted into trapezoidal voltage of the respective amplitude. The trapezoidal voltage pedestal, i.e. the voltage controlling the nominal hold-down force is adjusted by means of the variable resistor 73. The trapezoidal voltage droop and hence the slope of the V-shaped characteristics, which determines the rate of increase of the hold-down force in case of deviation of the rotation frequency of the rotor 1 from the nominal one, are adjusted by the variable resistor 71. The maximum of the trapezoidal voltage governing the starting characteristics of the vibration motor is adjusted by the variable resistor 75 through the medium of a diode 74.

The formed trapezoidal voltage controlling the hold-down force is supplied to the amplitude detector 65 to be detected there and then amplified in power by the transistors 80 and 84 to be finally applied to the winding 15 of the electromagnet 14.

The operating principle of the electric oscillator 6 employed in all the above described modifications of the vibration motor consists in the following.

The master oscillator 87 (FIG. 8) employing transistor 95 and 96 and based on a circuit of a balanced self-excited multivibrator rectangular pulses with a frequency close to the resonant frequency of the concentrator of ultrasonic vibrations. The formed pulses are delivered through a resistor 105 to a transistor 106. Pulses from a resistor 109 are supplied to transistors 107 and 108. Amplified pulses are fed to the synchro-matching filter 89 constructed in the form of an inductance coil 110 and a capacitor 111 which in conjunction with the capacitance of the working piezoelectric cell 5 are tuned to the resonant frequency of the concentrator 3. The synchro-matching filter 89 converts the train of pulses into a sinusoidal signal. The signal from the synchro-matching filter 98 is delivered to the working piezoelectric cell 5 to excite vibrations which are propagated in the concentrator 3. A sibusoidal voltage is induced in the feed-back piezoelectric cell 7 with a frequency equal to the natural frequency of the concentrator 3. The feed-back signal is supplied to the transistor 90 of the synchronizing stage 86, working as an amplifier-limiter. The formed pulses from the resistor 93 are fed through a capacitor 94 to the base of the transistor 95 of the master oscillator 87 to be synchronized with the frequency equal to the natural frequency of the concentrator 3.

The amplitude of oscillations of the electric oscillator 6 is controlled by the voltage supplied to the control input and drawn from the collector lead of the transistor 108 incorporated in the power amplifier 88.

The proposed vibration motor, as it was already said above, makes it possible to reduce durable instability and nonuniformity of rotation frequency of the rotor, improve starting characteristics of the vibration motor and provide a possibility for a wide functional control of rotation frequency of the rotor.

While describing the foregoing embodiments of the present invention, specific narrow terminology has been used for the sake of clarity. However, this invention is not limited to the terms adopted, and it should be borne in mind that each such term relates to all of the equivalent elements operating in a similar way and used for solving similar problems.

Although the present invention has been described in connection with the preferred embodiments thereof, it is evident that various alterations and modifications may occur without departing from the spirit and scope of the invention, as those skilled in the art will readily understand.

Such alterations and modifications are to be considered as falling within the spirit and scope of the invention and the appended claims.

What we claim is:

1. A vibration motor comprising:
    an electric oscillator provided with a sync input, a control input and an output;
    a working piezoelectric cell connected with said output of said electric oscillator and generating ultrasonic vibrations;
    a feed-back piezoelectric cell in contact with said working piezoelectric cell and connected with said sync input of said electric oscillator;

a concentrator of ultrasonic vibrations including a first stage contacting one of said piezoelectric cells, capable of taking up said vibrations and a second, driving stage designed to intensify said vibrations;

a rotor having a surface contacting said driving stage of said concentrator and being set to rotation by said vibration; and means for control of rotation frequency of said rotor by changing the force pressing said concentrator to said surface of said rotor which includes a rotation frequency pickup with an output; a frequency discriminator provided with an input and output and connected at the input with said output of said pickup; a controllable d-c power supply source having an input and an output and connected at the input with said output of said frequency discriminator; and an electromagnet provided with a winding and an armature, said winding being connected with said output of said power supply source and said concentrator being employed as said armature.

2. A vibration motor comprising:

an electric oscillator provided with a sync input, a control input and an output;

a working piezoelectric cell connected with said output of said electric oscillator and generating ultrasonic vibrations;

a feed-back piezoelectric cell in contact with said working piezoelectric cell and connected with said sync input of said electric oscillator;

a concentrator of ultrasonic vibrations including a first stage contacting one of said piezoelectric cells, capable of taking up said vibrations and a second, driving stage designed to intensify said vibrations;

a rotor having a surface contacting said driving stage of said concentrator and being set to rotation by said vibrations; and means for control of rotation frequency of said rotor by stabilizing the amplitude of ultrasonic vibrations of said driving stage of said concentrator of ultrasonic vibrations at a predetermined level which includes a limiter having an input, connected with said feed-back piezoelectric cell, and an output; an amplitude detector provided with an input, connected with said output of said limiter, and an output; a differential amplifier having an input, connected with said output of said amplitude detector, and an output; and an amplifier provided with an input connected with said output of said differential amplifier and an output coupled to said control input of said electric oscillator.

3. A vibration motor comprising:

an electric oscillator provided with a sync input, a control input and an output;

a working piezoelectric cell connected with said output of said electric oscillator and generating ultrasonic vibrations;

a feed-back piezoelectric cell contacting said working piezoelectric cell and connected with said sync input of said electric oscillator;

a concentrator of ultrasonic vibrations including a first stage contacting one of said piezoelectric cells, capable of taking up said vibrations and a second, driving stage designed to intensify said vibrations;

a rotor having a surface contacting said driving stage of said concentrator and being rotatable by said vibrations; and means for rotation frequency control of said rotor by changing a hold-down force pressing said driving stage of said concentrator to said surface of said rotor and by stabilizing the amplitude of ultrasonic vibrations of said driving stage of said concentrator of ultrasonic vibrations at a predetermined level including a rotation frequency pickup with an output; a frequency discriminator provided with an input and a first output and connected at said input with said output of said pickup; a controllable d-c power supply source having a first input and a first output and connected at its first input with the first output of said frequency discriminator; and electromagnet provided with a winding and an armature, said winding being connected with the first output of said power supply source and said concentrator being employed as said armature; a limiter having an input, connected with said feed-back piezoelectric cell, and an output; an amplitude detector provided with an input, connected to said output of said limiter, and an output; a differential amplifier having an input connected with said output of said amplitude detector, and an output; an amplifier provided with an input connected with said output of said differential amplifier and an output connected with said control input of said electric oscillator.

4. A vibration motor comprising:

an electric oscillator provided with a sync input, a control input and an output;

a working piezoelectric cell connected with said output of said electric oscillator and generating ultrasonic vibrations;

a feed-back piezoelectric cell contacting said working piezoelectric cell and connected with said sync input of said electric oscillator;

a concentrator of ultrasonic vibrations including a first stage contacting one of said piezoelectric cells, capable of taking up said vibrations and a second, driving stage designed to intensify said vibrations;

a rotor having a surface contacting said driving stage of said concentrator and being set to rotation by said vibrations; and means for rotation frequency control of said rotor by changing the force pressing said driving stage of said concentrator to said surface of said rotor in concert with varying the amplitude of ultrasonic vibrations of said driving stage of said concentrator including a rotation frequency pickup of said rotor with an output; a frequency discriminator provided with an input, a first output at which the amplitude of formed pulse level is in the relay-type relationship versus the rotation frequency of said rotor, and a second output at which the duration of formed pulses is a V-shaped function of the rotation frequency of said rotor, said input being connected with said output of said pickup; a pulse converter having an input and an output and connected at its input with said output of said frequency discriminator, at which the duration of formed pulses is a V-shaped function of the rotation frequency of said rotor; an electromagnet provided with a winding and an armature, said winding being connected with said output of said pulse convertor and said concentrator being employed as said armature; an amplifier having an input and an output and connected at its input with said output of said frequency discriminator, at which the amplitude of formed pulse level is in a relay-type relationship versus the rotation frequency of said rotor, and coupled at its output to said control input of said electric oscillator.

5. A vibration motor according to claim 4, wherein said frequency discriminator comprises a pedestal different-polarity pulse generator having an input, a triggering voltage input, a first output and a second output; a first logic circuit element having a first input, connected with the first output of said pedestal different-polarity pulse generator, a second input and an output; a second logic circuit element having a first input, connected with the second output of said pedestal different-polarity pulse generator, a second input and an output; a first trigger provided with an input coupled electrically to said output of said rotation frequency pickup of said rotor, a first output connected with the second input of said first logic circuit element and a second output connected with said second input of said second logic circuit element and with said triggering input of said pedestal different-polarity pulse generator; a third logic circuit element having a first input connected with said output of said second logic circuit element, a second input connected with said output of said first logic circuit element and an output connected with said input of said pulse converter; and a second trigger having a first input connected with said output of said second logic circuit element, a second input connected with said output of said first logic circuit element and an output connected with said input of said amplifier and with said input of said pedestal different-polarity pulse generator.

6. A vibration motor according to claim 4, wherein said pulse converter comprises a trapezoidal voltage shaper provided with an input electrically coupled to said second output of said frequency discriminator, at which the duration of formed pulses is a V-shaped function of the rotation frequency of said rotor, and an output; an amplitude detector having an input, connected with said output of said trapezoidal voltage generator, and an output; and a power amplifier provided with an input connected with said output of said amplitude detector and an output connected with said winding of said electromagnet.

7. A vibration motor according to claim 5, wherein said pulse converter comprises a trapezoidal voltage shaper provided with an input electrically coupled to said second output of said frequency discriminator, at which the duration of formed pulses is a V-shaped function of the rotation frequency of said rotor, and an output; an amplitude detector having an input connected with said output of said trapezoidal voltage generator, and an output; and a power amplifier provided with an input connected with said output of said amplitude detector and with an output connected with said winding of said electromagnet.

8. A vibration motor comprising:
an electric oscillator effective to produce an ultrasonic output;
a working piezoelectric cell responsive to said output to generate ultrasonic vibrations;
a feed-back piezoelectric cell in contact with said working piezoelectric cell operative to provide a sync signal to said electric oscillator;
a concentrator of ultrasonic vibrations contacting one of said piezoelectric cells, and being effective to take up and to intensify said ultrasonic vibrations;
a rotor having a surface contacting said concentrator and being rotatable by said ultrasonic vibrations;
means for pressing said concentrator to said surface with a hold-down force;
means for sensing a condition of said vibration motor; and
means for rotation frequency control of said rotor by changing said hold-down force in response to the sensed condition.

9. A vibration motor comprising:
an electric oscillator effective to provide an ultrasonic output;
a working piezoelectric cell responsive to said output to generate ultrasonic vibrations;
a feed-back piezoelectric cell in contact with said working piezoelectric cell operative to provide a sync signal to said electric oscillator;
a concentrator of ultrasonic vibrations contacting one of said piezoelectric cells, and being effective to take up and to intensify said ultrasonic vibrations;
a rotor having a surface contacting said concentrator and being rotatable by said ultrasonic vibrations;
means for sensing a condition of said vibration motor; and
means for rotation frequency control of said rotor by stabilizing the amplitude of ultrasonic vibrations of said concentrator at a predetermined level in response to the sensed condition.

10. A vibration motor according to claim 9; wherein the sensed condition is an amplitude of said ultrasonic vibrations.

11. A vibration motor comprising:
an electric oscillator effective to produce an ultrasonic output;
a working piezoelectric cell responsive to said output to generate ultrasonic vibrations;
a feed-back piezoelectric cell contacting said working piezoelectric cell operative to provide a sync signal to said electric oscillator;
a concentrator of ultrasonic vibrations contacting one of said piezoelectric cells, and being effective to take up and to intensify said ultrasonic vibrations;
a rotor having a surface contacting said concentrator and being rotatable by said ultrasonic vibrations;
means for pressing said concentrator to said surface with a hold-down force;
means for sensing a rotating condition of said vibration motor;
means for sensing an amplitude of said ultrasonic vibrations; and
means for control of rotation frequency of said rotor including means for changing said hold-down force in response to the sensed rotating condition and means for stabilizing the amplitude of said ultrasonic vibrations at a predetermined level in response to the sensed amplitude.

12. A vibration motor comprising:
an electric oscillator effective to produce an ultrasonic output;
a working piezoelectric cell responsive to said output to generate ultrasonic vibrations;
a feed-back piezoelectric cell contacting said working piezoelectric cell operative to provide a sync signal to said electric oscillator;
a concentrator of ultrasonic vibrations contacting one of said piezoelectric cells and being effective to take up and to intensify said ultrasonic vibrations;
a rotor having a surface contacting said concentrator and being rotatable by said ultrasonic vibrations;

means for pressing said concentrator to said surface with a hold-down force;

means for sensing a rotating condition of said vibration motor; and means for rotation frequency control of said rotor in response to the sensed rotating condition by changing said hold-down force and by varying an amplitude of said ultrasonic vibrations.

13. A vibration motor according to claim 8, 9, 11 or 12; wherein the sensed condition is a rotational speed of said rotor.

* * * * *

UNITED STATES PATENT AND TRADEMARK OFFICE
CERTIFICATE OF CORRECTION

PATENT NO. : 4,249,100

DATED : February 3, 1981

INVENTOR(S) : Petr E. VASILIEV et al

It is certified that error appears in the above—identified patent and that said Letters Patent is hereby corrected as shown below:

Column 4, line 26 "23" should be --3--

Column 10, line 48 "over/speeding" should be --over-speeding--

Signed and Sealed this

Sixteenth Day of June 1981

[SEAL]

Attest:

RENE D. TEGTMEYER

*Attesting Officer*  *Acting Commissioner of Patents and Trademarks*